INVENTOR.
LLOYD G. MILLER

United States Patent Office 3,426,576
Patented Feb. 11, 1969

3,426,576
SELF-LEVELING SCORSBY MACHINE
Lloyd G. Miller, Rockford, Mich., assignor to
Lear Siegler, Inc.
Filed Feb. 21, 1966, Ser. No. 528,911
U.S. Cl. 73—1
Int. Cl. G01m 7/00; G01e 25/00
6 Claims

ABSTRACT OF THE DISCLOSURE

A scorsby machine for simulating the motions of an aircraft for testing navigational instruments. A table is mounted above the usual scorsby platform by shiftable positioning means so that the table can be returned to a horizontal position for checking the instruments mounted thereon without disturbing the position of the scorsby platform.

---

This invention relates to machines for dynamically testing control instruments, commonly referred to as "scorsby machines," and more particularly to a new form of such a machine having integral structure by which the test platform and the instrument supported thereon for testing purposes may repeatably be precisely brought into a level condition without removal from the test machine.

Guidance or control instruments such as gyroscopes and the like must be tested by the manufacturer under conditions which simulate those found in actual usage, typically, a motion including roll, pitch, and yaw components. This testing motion has for some time come to be known as "scorsby motion," and it is produced by a device known as a scorsby machine having a tiltable platform or table upon which the instrument is placed and which is then driven with the prescribed motion to test the instrument thereupon while performance readings are taken at various points during the test.

It is also necessary after the three dimensional movement during such testing to periodically place the instrument under test in exactly level position, or as close thereto as possible, which in accordance with the high precision of present-day guidance instruments, must sometimes be within a tolerance of from one-quarter degree to one minute. While scorsby machines of the type currently in use can be approximately leveled through careful and precise positioning of their eccentric drive mechanisms, the accuracy obtained depends largely upon the accumulative mechanical tolerances of a multiple component linkage system. Consequently, the approximate level condition provided thereby is not sufficiently accurate, and it has become accepted practice to physically remove the instrument from the test platform and place it upon a fixed level surface, typically a heavy metal or stone plate installed for such a purpose. While this does place the instrument in an accurately level position, moving the instrument from the scorsby platform is very undesirable, since not only is excessive time consumed but the instrument undergoes acceleration forces which are likely to produce at least partially erroneous test readings. Nonetheless, the practice of moving the instrument is normally used, since, in spite of the drawbacks of this technique, it is the most accurate way of obtaining level readings. No better procedure has previously been available.

It is a major object of the present invention to provide a new concept for scorsby motion-testing machines by which such a machine may be made self-leveling, such that instruments need not be removed from actual test conditions upon the platform in order to be precisely leveled whenever testing requires. The self leveling feature is attained momentarily, easily, and dependably, thereby allowing rapid and frequent checking of the instrument at accurately level orientation after a particular type of motion testing. The novel machine completely removes the disadvantages and potential inaccuracies involved with removing the instrument from the scorsby machine to another fixed surface for checking. The testing machine is thereby converted from a mere motion producer to a complete test unit providing three dimensional movement in one instant and locked accurate leveling reference means in the next instant.

Another important object of the present invention is to provide a means for converting conventional scorsby motion machines into one having a self-leveling configuration, so that existing machines may be greatly improved without the necessity of providing completely new machinery.

The foregoing major objects of the invention and the advantages provided thereby, together with additional objects and advantages no less a part thereof, will become increasingly apparent following consideration of the ensuing specification and its appended claims, particularly when these are taken in conjunction with the accompanying illustrative drawing setting forth one preferred embodiment of the invention.

Briefly stated, the present invention provides structure for improving the performance of the conventional scorsby machine, which has a universally tiltable driven platform for imparting scorsby movement to a guidance or control instrument supported thereupon, with the improvement structure including positioning means mountable upon the scorsby platform and oriented vertically thereof, a table mounted atop the said positioning means, and table-leveling means located in vertical alignment with portions of the said table. The positioning means of the invention is arranged to shift the said table from a first position in which scorsby movements from the platform of the conventional scorsby device are transferred freely to the said table through the positioning means, and also to shift the table to a second position in which it is made accurately level by operation of the said leveling means.

Figure 1:
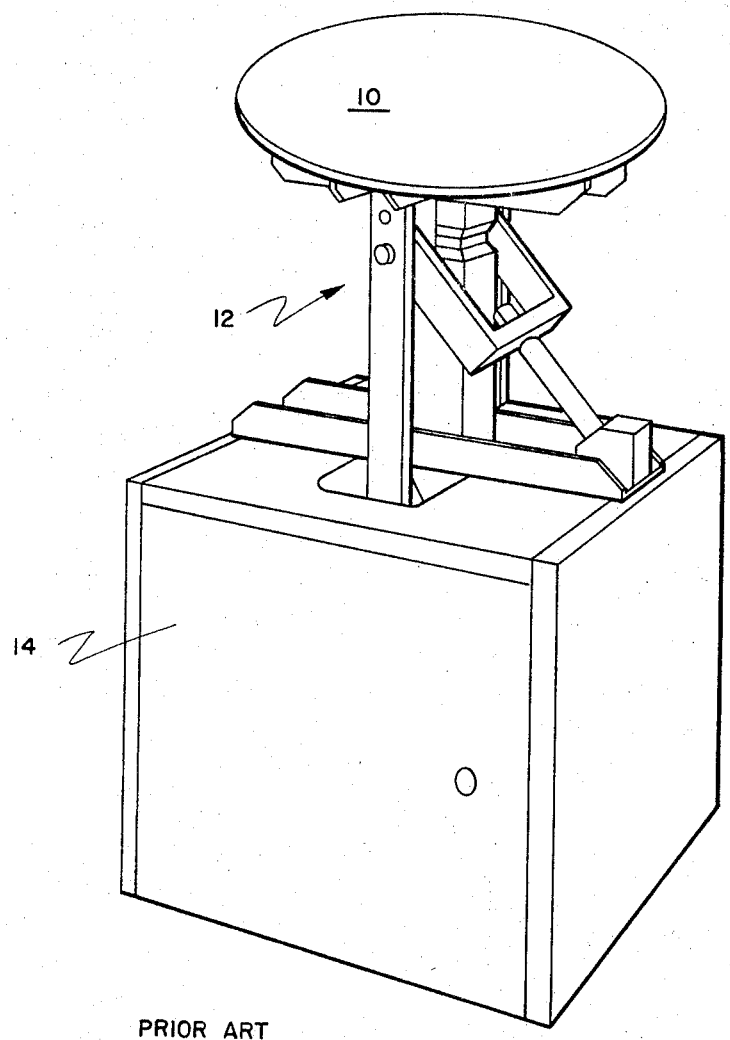
FIG. 1 is a frontal perspective illustration of a typical conventional scorsby motion machine.

Referring now in more detail to the drawings, a typical conventional scorsby machine is illustrated in FIG. 1 in order to afford a more complete understanding of the present novel converting structure. In a typical scorsby machine as shown here, a platform 10 is mounted by a support and drive linkage 12 to a cabinet 14 housing a power train (not shown) which usually consists of an electric motor and an eccentric drive which is connected to the linkage 12 and geared to the output shaft of the motor. Inasmuch as scorsby machines of this type are very well known to those skilled in the art of testing control and guidance instruments, a highly detailed description of such is not necessary. The eccentric drive and linkage arrangement 12 serves to impart a complex motion to platform 10, to simulate all expected vehicle movements, including pitch, roll, and yaw components. The path of movement of the platform normally approximates a cone-shaped pattern about the center of the platform. Thus, instruments placed upon the continuously-moving platform for test purposes undergo motion which to a high degree simulates that found in actual flight.

Figure 2:
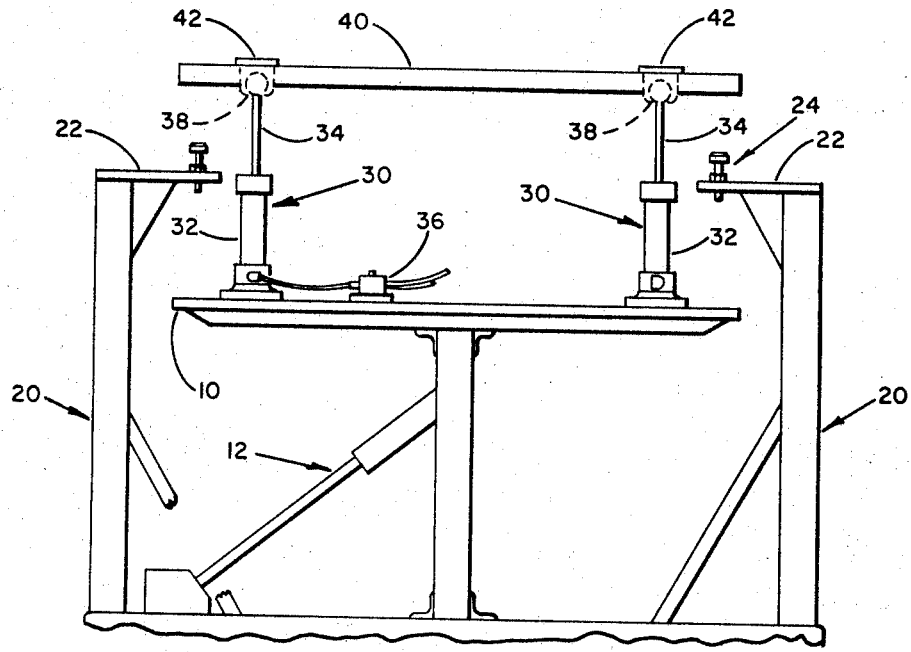
FIGS. 2 is an enlarged, fragmentary side elevation of a conventional scorsby machine modified by the converting structure of the present invention into a scorsby motion machine also having a self-leveling function, and shown in a first operative position.
Figure 3:
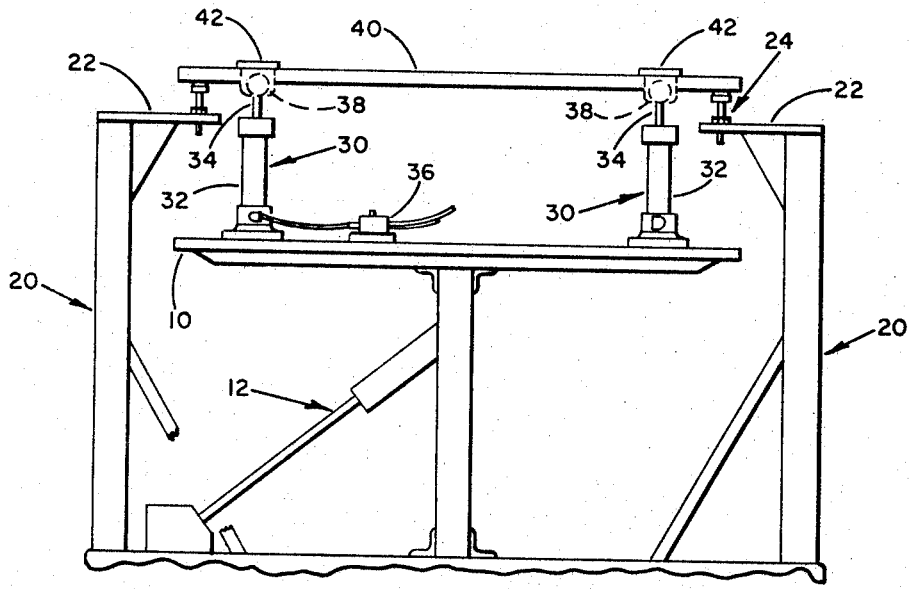
FIG. 3 is an enlarged, fragmentary side elevation of the structure shown in FIG. 2 in a second operative position.

The converting structure seen in FIGS. 2 and 3 of the drawings is designed to complement a conventional scorsby machine of the general type just described. This converting structure includes three basic component sections. These are framing members 20 which are secured to the top of the conventional scorsby cabinet 14, positioning means 30 which are secured to the top of the conventional scorsby platform 10, and a table member 40 which is mounted atop the positioning members 30.

More specifically, the framing members 20 comprise upright supports which are fixedly secured to the conventional scorsby apparatus and suitably braced so as to be rigid and stable. The framing members have laterally offset upper extremities 22, which are arranged to extend inwardly toward each other and over the scorsby platform 10. The offset extremities 22 preferably carry three arrestment pads 24, which are equally spaced over the top of the scorsby platform 10 and around the periphery thereof, at intervals of 120 degrees relative to the said platform. Structurally, each arrestment pad is preferably in the form of a bolt having an enlarged head, which is located above the offset portions 22 of the framing members by threading the shank of the bolt into appropriately threaded apertures formed in the said framing portions. An appropriate lock nut is preferably provided, for locking the bolt to the framing with a desired extent of the bolt protruding upwardly therefrom.

The positioning means 30 preferably comprises three upright pneumatic or hydraulic cylinders 32 having lengthwise extendable piston means 34 which are actuated outwardly of the cylinders when a control valve means 36 supplies pressurized fluid to the cylinders, and which retract into the cylinders when the valve 36 releases the pressurized fluid from the cylinders. The cylinders 32 may be of a conventional nature such as is readily available, and the same is true of their control valve means 36, which preferably is remotely actuable, as by an electrical impulse.

The upper extremities of the pistons or plungers 34 are equipped with spherical mounting means 38, which each form a part of ball joints having socket portions 42 that are securely mounted to the table 40. In this manner, the table is universally tiltably mounted atop the positioning means 30 by the said ball joints. The table 40 is itself a flat, disc-like object which is a substantial duplicate of the scorsby platform 10. The table 40 is mounted above and concentric with the said platform, with the platform below the arrestment pads 24 and the table directly above the latter and with the periphery of the table extending over the arrestment pads.

When testing is to be commenced and scorsby motion is desired to be imparted to a given instrument, the instrument is mounted atop table 40, control valve means 36 is actuated, and pistons 34 of cylinders 32 are thereupon extended to raise table 40 and the instrument thereupon above arrestment pads 24. The scorsby drive mechanism is then actuated, and through the conventional linkage 12 plaform 10 is driven in scorsby motion. Inasmuch as cylinders 32 and their extended pistons 34 are in effect a rigid connecting link between table 40 and scorsby platform 10, the table is driven by the platform in identical scorsby motion, which is of course transferred to the instrument mounted atop the table 40 for testing.

When the point in the test procedure is reached where the instrument must be held in a level position, control valve means 36 is actuated to relieve the pressurized fluid from cylinders 32, and consequently pistons 34 are retracted into the cylinders and the table 40 and the instrument thereupon settle gradually downward onto the tops of arrestment pads 34. The arrestment pads are previously accurately adjusted and preset by changing their threaded position relative to the offset framing portions 22, so that the tops of their head portions define a precisely level plane. Consequently, when the table is lowered onto the arrestment pads, both its flat lower and upper surfaces lie in a level plane, and the instrument thereupon is quickly and effortlessly positioned in the desired manner.

Normally, the linkage system 12 is temporarily stopped or disengaged so that the platform 10 is not driven in scorsby motion during the interval that the table 40 rests horizontally atop the arrangement pads. However, the particular position of the scorsby platform 10 is not critical to the level orientation of the table 40 and the test instrument thereupon, since this is established by the positioning of the arrestment pads, and is general independent of the particular degree of extension or retraction of any of piston members 34.

Following the required measurements made with the instrument in a horizontal position, the control valve means 36 is once again actuated to extend pistons 34 from cylinders 32, thereupon raising the table 40 away from arrestment pads 24 so that the scorsby motion of platform 10 is once again imparted to table 40 through cylinders 32 and their respective pistons 34.

From the foregoing, it will be quite apparent to those skilled in the art that the present converting structure and resulting novel combinations provide an extremely easy and excellent method of scorsby testing, which completely eliminates the requirement of removing the instrument from the scorsby platform in order to level the instrument.

The conversion of conventional scorsby machines to the new and preferred configuration of the invention is readily accomplished, and the structure involved is not particularly complex, nor is it expensive. In fact, the structure is relatively simple, in spite of the unique results obtained. Thus, manufacturers having conventional scorsby machines may easily and readily incorporate the present structure into their existing machines with only moderate expense which is far overshadowed by the greatly improved results provided thereby. The concept underlying the invention is straightforward and uncomplicated, and indeed the very simplicity of the resulting device will be seen to augment its uniqueness and desirability, since the unique concept embodied in the device provides a complete solution to a problem which has long vexed those utilizing scorsby testing techniques.

It is entirely possible that upon a consideration of the foregoing disclosure, those skilled in the pertinent arts may design other embodiments of the concept underlying the invention, or may device certain changes in the specific structure shown and described herein. Consequently, all such further embodiments and changed structures as are clearly based on the invention and utilize its concept are thus to be considered as within the scope of the claims appended herebelow, unless these claims by their language specifically state otherwise.

I claim:

1. In an apparatus for the testing of control instruments, of the type having a universally tiltable driven platform element for imparting scorsby movements to an instrument supported thereupon, the improvement comprising: positioning means mountable upon such platform element and oriented vertically thereof; an instrument support table mounted atop said positioning means; and horizontally indexing table leveling means in vertical alignment with portions of said table; said positioning means arranged to shift said table with respect to said platform element while leaving the latter in any given rest position, from a first position in which said scorsby movements are freely transferable from said platform to said table through the positioning means, to a second position in which said table is made level by indexing said table portions against said level means.

2. The improvement in scorsby motion apparatus defined in claim 1, wherein said table is pivotally secured to said positioning means and is made level in said second position by said positioning means urging said table into operative engagement against said leveling means.

3. The improvement in scorsby motion apparatus defined in claim 2, wherein said positioning means includes a plurality of remotely actuable lengthwise extendable and retractable plunger members spaced symmetrically relative to each other, said members shifting said table between said first and second positions upon lengthwise extension and retraction thereof.

4. The improvement in scorsby motion apparatus defined in claim 3, wherein said table-leveling means includes a plurality of arrestment pads against which said table may be positioned for leveling by said positioning means plunger members.

5. The improvement in scorsby motion apparatus defined in claim 4, wherein said arrestment pads are fixed upright posts having table-contacting means at their upper ends, said posts being arranged symmetrically beneath said table, and said positioning means plunger members being arranged to lower said table into vertical supporting arrangement onto said posts in said second position.

6. The improvement in scorsby motion apparatus defined in claim 5, wherein said positioning means are pneumatic cylinders having pistons forming said plunger members.

References Cited

UNITED STATES PATENTS 2,705,421  4/1955  Arnold _____ 73—1

FOREIGN PATENTS 558,374  12/1944  Great Britain.

S. CLEMENT SWISHER, *Primary Examiner.*